US010083413B2

United States Patent
Sun et al.

(10) Patent No.: US 10,083,413 B2
(45) Date of Patent: Sep. 25, 2018

(54) OPTIMIZED PLACEMENT OF ELECTRIC VEHICLE CHARGING STATIONS

(71) Applicant: SAP SE, Walldorf (DE)

(72) Inventors: Gufei Sun, Shanghai (CN); Heng Wang, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 558 days.

(21) Appl. No.: 14/682,049

(22) Filed: Apr. 8, 2015

(65) Prior Publication Data

US 2016/0300170 A1    Oct. 13, 2016

(51) Int. Cl.
  *H02J 7/00* (2006.01)
  *G06Q 10/06* (2012.01)
  *B60L 11/18* (2006.01)

(52) U.S. Cl.
  CPC .... *G06Q 10/06315* (2013.01); *B60L 11/1825* (2013.01); *B60L 11/1848* (2013.01)

(58) Field of Classification Search
  CPC ............. B60L 11/1825; B60L 11/1848; G06Q 10/06315
  See application file for complete search history.

(56) References Cited

U.S. PATENT DOCUMENTS

| | | | |
|---|---|---|---|
| 6,614,204 B2 | 9/2003 | Pellegrino et al. | |
| 7,582,979 B2 | 9/2009 | Oyobe et al. | |
| 7,986,126 B1 | 7/2011 | Bucci et al. | |
| 8,446,124 B2 | 5/2013 | Nagy et al. | |
| 8,725,306 B2 | 5/2014 | Ramezani et al. | |
| 8,766,595 B2 | 7/2014 | Gaul et al. | |
| 8,914,173 B2 | 12/2014 | Biondo et al. | |
| 2006/0149691 A1 | 7/2006 | Sindambiwe | |
| 2008/0155070 A1* | 6/2008 | El-Damhougy | G06F 15/177 709/220 |
| 2009/0082957 A1 | 3/2009 | Agassi et al. | |
| 2010/0094496 A1 | 4/2010 | Hershkovitz et al. | |
| 2011/0193522 A1 | 8/2011 | Uesugi | |
| 2011/0238289 A1 | 9/2011 | Lehmann et al. | |
| 2012/0109519 A1 | 5/2012 | Uyeki | |
| 2013/0222158 A1* | 8/2013 | Dai | G06Q 50/30 340/995.13 |
| 2014/0214459 A1 | 7/2014 | Ryder et al. | |

OTHER PUBLICATIONS

T. Donna Chen At Al., The Electric Vehicle Charging Station Location Problem: A Parking-Based Assignment Method for Seattle, Jan. 2013, Proceedings of the 92nd Annual Meeting of the Transportation Research Board, Washington DC.

* cited by examiner

*Primary Examiner* — Vuthe Siek
(74) *Attorney, Agent, or Firm* — Klarquist Sparkman, LLP

(57) ABSTRACT

Disclosed herein are technologies for facilitating placement of charging stations. In accordance with one aspect, sensor data of electric vehicles is received. A charging demand distribution over a set of locations is determined based on the sensor data. Candidate locations are selected from the set of locations based on the charging demand distribution. Placement of charging stations at one or more of the candidate locations is then optimized.

16 Claims, 6 Drawing Sheets

| | |
|---|---|
| Location ID | Identifier of a location or an area. |
| Car ID | Identifier of a car |
| Battery Level | Battery Level of a car |
| Start Parking Time | 0:00-23:59 |
| End Parking Time | 0:00-23:59 |
| Parking Time | Use $T_p$ to represent it, $T_p > T_s$ |

Function PenaltyCaculator Find the nearest charging station for each vehicle and compute the distance between them. Summarize the distances as penalty. $Distance(L_1, L_2)$ is the function of computing distance between location $L_1$ and Location $L_2$. Input: $X$ is the vector of $x_1, x_2, \ldots, x_n$, which indicates the current charging station placement solution.

```
1:  FUNCTION PenaltyCaculator (X)
2:  BEGIN
3:      stations_list = the locations i where x_i > 0
4:      unselected_loc_list = the unselected locations
5:      penalty = 0
6:      FOR loc IN unselected_loc_list
7:          min_distance = MAX_INTEGER
8:          FOR sta IN stations_list
9:              IF Distance(loc, sta) < min_distance
10:                 min_distance = Distance(loc, sta)
11:         penalty += min_distance
12:     RETURN penalty
13: END
```

*Fig. 5*

OPTIMIZED PLACEMENT OF ELECTRIC VEHICLE CHARGING STATIONS

TECHNICAL FIELD

The present disclosure relates generally to a framework for facilitating optimized placement of electric vehicle charging stations.

BACKGROUND

Unlike traditional vehicles, electric vehicles do not need a gasoline or propane fueling station to refill energy. Most electric vehicles can be charged anywhere with an electrical outlet. However, charging stations are still needed for faster charging or refilling energy for long distance road trips.

The considerations for placing electric charging stations are different from those of traditional gasoline fueling stations. First, the charging process may take longer than a gasoline refueling process. Even the fastest charging station may need over an hour to fully charge a vehicle. Second, the efficiency of a charging station is highly related to its utilization rate and not its fuel supply, since a charging station will always be ready to provide electricity as long as the power system it is connected to is supplying power. Third, since an electric charging station will unlikely explode, it can be located in crowded areas so as to increase its utilization rate.

SUMMARY

A computer-implemented technology for facilitating placement of charging stations is described herein. In accordance with one aspect, sensor data of electric vehicles is received. A charging demand distribution over a set of locations is determined based on the sensor data. Candidate locations are selected from the set of locations based on the charging demand distribution. Placement of charging stations at one or more of the candidate locations is then optimized.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 3 illustrates an exemplary parking record;

FIG. 5 illustrates an exemplary method of determining penalty value; and

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

The framework described herein may be implemented as a method, computer-controlled apparatus, a computer process, a computing system, or as an article of manufacture such as a computer-usable medium.

One aspect of the present framework facilitates placement of electric vehicle charging stations based on charging demand prediction. More particularly, a prediction model is provided to estimate charging demand distribution based on historical data. Such historical data may be supplied by sensors installed in electric vehicles. As electric vehicles are typically equipped with sensors, it is possible to monitor, track and analyze the behavior of electric vehicle drivers, thus enabling accurate prediction of charging demand distribution.

After the charging demand is estimated, the framework may determine candidate locations where charging stations may be placed. The placement may be further optimized based on an objective function while fulfilling one or more constraints. The optimized scale or size of each charging station may also be determined. These and various other features and advantages will be apparent from the following description.

For purposes of illustration, the present framework may be described in the context of charging stations for electric cars. It should be appreciated, however, that the present framework may also be applied in other types of applications, such as charging stations for other types of electric vehicles, systems or devices. An "electric vehicle" uses one or more electric motors for propulsion and may be powered by electricity from a self-contained battery that is rechargeable at, for example, one of the charging stations. Electric vehicles may include road vehicles, rail vehicles, surface and underwater vessels, aircraft and so forth.

Figure 1:
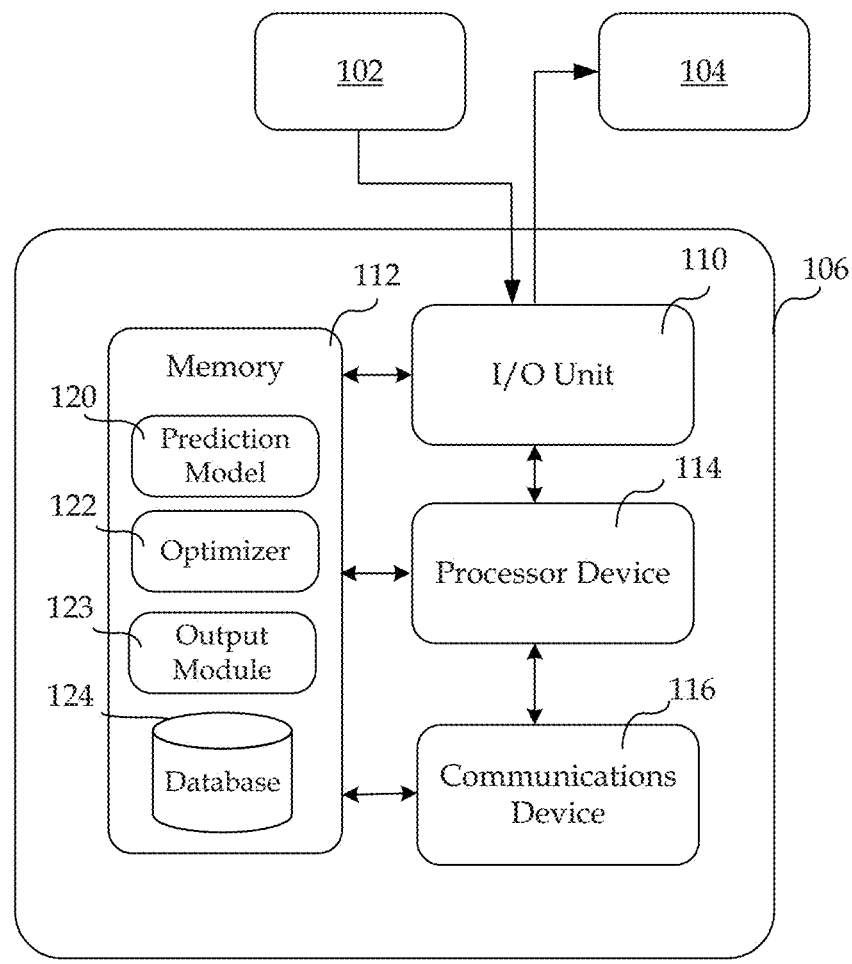
FIG. 1 is a block diagram illustrating an exemplary system.

FIG. 1 shows a block diagram illustrating an exemplary system 100 that may be used to implement the framework described herein. System 100 includes a computer system 106 communicatively coupled to an input device 102 (e.g., keyboard, touchpad, microphone, camera, etc.) and an output device 104 (e.g., display device, monitor, printer, speaker etc.). Computer system 106 may include a communications device 116 (e.g., a modem, wireless network adapter, etc.) for exchanging data with a network using a communications (e.g., telephone line, wireless or wired network link, cable network link, etc.). The network may be a local area network (LAN) or a wide area network (WAN).

Computer system 106 includes a processor device or central processing unit (CPU) 114, an input/output (I/O) unit 110, and a memory module 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a smart device (e.g., smart phone), a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various programs, such as a prediction model 120, an optimizer 122, an output module 123 and a database (or data repository) 124 for implementing the techniques described herein, all of which may be processed by processor device 114. As such, the computer system 106 is a general-purpose computer system that becomes a specific purpose computer system when executing the machine-executable instructions. Alternatively, the various techniques described herein may be implemented as part of a software product. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein. It should be appreciated that the different components of the computer system 106 may be located on different machines. For example, prediction model 120, optimizer 122, output module 123 and/or database 124 may reside in different physical machines.

Figure 2:
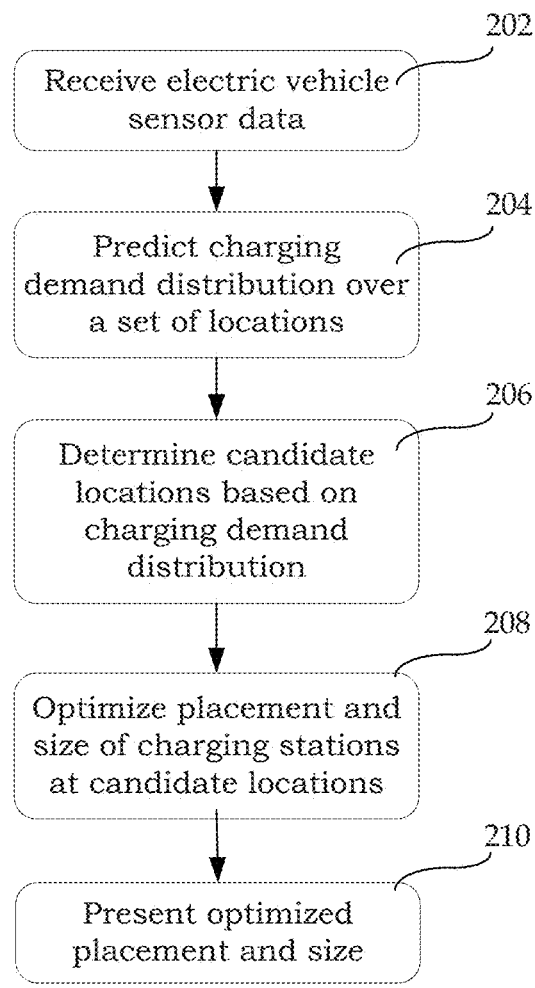
FIG. 2 is a block diagram illustrating an exemplary method of generating an optimized placement of electric vehicle charging stations.

FIG. 2 is a block diagram illustrating an exemplary method 200 of generating an optimized placement of electric vehicle charging stations. The computer system 106 of FIG. 1 may be configured by computer program code to implement some or all acts of the process 200. While process flow 200 describes a series of acts that are performed in sequence, it is to be understood that process 200 is not limited by the order of the sequence. For instance, some acts may occur in a different order than that described. In addition, an act may occur concurrently with another act. In some instances, not all acts may be performed.

At 202, prediction model 120 receives sensor data of electric vehicles. In some implementations, historical vehicle sensor data is stored in, and retrieved from, database 124. The historical vehicle sensor data is previously collected from a set of electric vehicles with in-vehicle sensors. Vehicle sensor data may include battery level data, location data (e.g., global positioning system or GPS data), vehicle identification information, and so forth.

Battery level data may provide information about the initial battery level when charging first starts and final battery level when charging is completed. The initial battery level $L_0$ may be used to estimate the probability of charging behavior. By collecting a large volume of initial battery level data and performing statistical analysis thereof, the probability $P(L_0)$ that a driver will choose to charge the vehicle given an initial battery level $L_0$ may be derived. The final battery level $L_f$ reflects how long a driver will occupy a charging pile or outlet at the charging station (i.e., charging time). The charging time may be determined by $$\frac{L_f - L_0}{v},$$

where $v$ is the charging rate. Accordingly, the statistics derived from the final battery level data reflects a general charging demand. Assuming that charging time follows a normal distribution, an average charging time $\overline{T}(L_0)$ and the standard deviation $\sigma(L_0)$ may be used to model this charging time.

The sensor data may also include location data of the electric vehicles. By monitoring the location data, an accumulated map of vehicles may be generated. Such map reflects the physical distribution of vehicles and links the charging demand to a set of locations. Since vehicles need to be stopped while charging, only locations with stopping (or parking) times longer than a predetermined time period $T_s$ may be recorded and stored in parking records for further processing. The predetermined time period $T_s$ may be, for example, 30 minutes or more.

FIG. 3 illustrates an exemplary parking record 300. The exemplary parking record 300 may be derived from location data and stored in, and retrieved from, the database 124. As shown, the exemplary parking record 300 may include the location or area identifier (ID), the car ID, battery level, start and end parking times and the parking time duration. The parking distribution of cars may be sampled and analyzed daily. Differences from time to time may also be analyzed by sampling between more days to see the overall car distribution.

Returning to FIG. 2, at 204, prediction model 120 predicts charging demand distribution over a set of locations. The set of locations are those locations where stopping times of the electric vehicles are longer than a predetermined period, such as those locations stored in the parking records.

The charging demand distribution may be estimated by first determining the expectation of charging time for each parking record. The following equation may be used to represent the expectation of charging time without considering the parking time:

$$T_0 = P(L_0)\overline{T}(L_0) \qquad (1)$$

wherein $P(L_0)$ denotes the probability that a driver will choose to charge the vehicle given an initial battery level $L_0$ and $\overline{T}(L_0)$ is the average charging time.

However, such expectation does not take into account the parking time. An adjustment may be made to represent the effect of the actual parking time. It can be observed that if the recorded parking time $T_p$ is longer than expected charging time $T_0$, the actual charging time may be longer, but not longer than the time needed for a full charge ($T_F$). If the recorded parking time is shorter than the expected charging time $T_0$, it is highly possible that the actual charging time will be shorter. Accordingly, an adjustment coefficient $\alpha(T_0 - T_p)$ may be used to represent this effect. The final equation for determining the expectation of charging time $T_c$ may be expressed as follows:

$$T_c = \begin{cases} \alpha(T_0 - T_p)T_0 & T_0 \geq T_p \\ \min(T_F, T_p) & T_0 < T_p \end{cases} \qquad (2)$$

wherein $T_0$ is the expectation of charging time without parking time consideration (determined by equation (1)), $T_p$ is the recorded parking time, $T_F$ is the charging time needed for a full charge and $\alpha(T_0-T_p)$ is the adjustment coefficient, wherein $\alpha(0)=1$.

Figure 4:
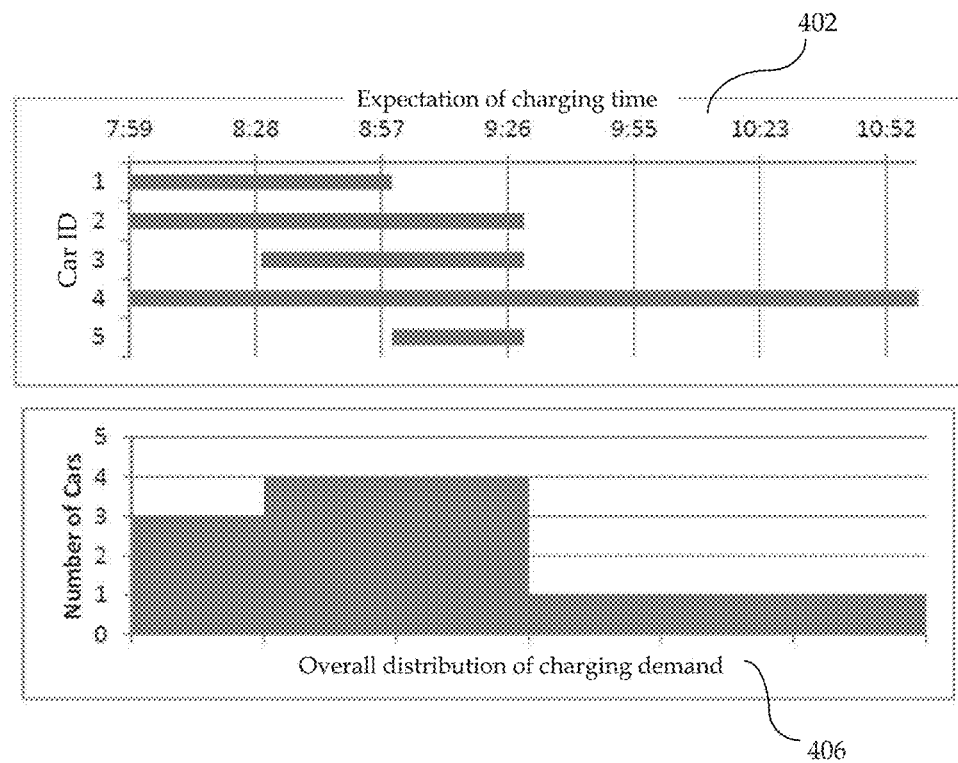
FIG. 4 illustrates exemplary distributions of charging demand.

FIG. 4 illustrates exemplary distributions of charging demand. More particularly, chart 402 shows the expectation of charging time for each car (or parking record) at a particular location. The expectations of charging time for multiple cars may be accumulated at different time points to generate an overall distribution of charging demand. Chart 406 shows the overall distribution of charging demand. The overall distribution of charging demand represents the number of vehicles expected to be charged for each time point and for each recorded location. The overall distribution of charging demand may be generated by counting, at each time point, the number of cars with non-zero expectation of charging time.

The demand prediction for each location may be determined using different strategies. For example, the demand prediction may be set to the highest number of vehicles derived from the overall distribution of charging demand. Alternatively, the demand prediction may be set to a value lower than such highest number of vehicles to ensure higher utilization rate (i.e., lower number of piles to be installed will ensure higher utilization for each pile).

Returning to FIG. 2, at 206, prediction model 120 determines candidate locations based on the predicted demand for different locations. Candidate locations are feasible sites for installing charging stations. Not all locations are chosen as candidate location. An unpopular place is not a good choice for building charging station. Candidate locations may be those locations with predicted demand greater that a predetermined number. Locations that people are unlikely to stay too long, such as a post office, may be excluded from the set of candidate locations. By filtering the recorded locations and selecting only those locations that are feasible, the speed of the optimization process performed in the following step 208 may advantageously be enhanced.

At 208, optimizer 122 optimizes placement of charging stations at the candidate locations. In some implementations, optimizer 122 may also determine the optimal size of each charging station. The optimization step may be modeled by an objective function and constraints. For purposes of illustration, integer programming is described herein to solve the optimization problem. It should be appreciated that other types of optimization methods, such as genetic algorithms, neural networks and other machine learning algorithms, may also be used.

Integer programming is an optimization technique that restricts some or all of the variables to be integers. The number of decision variables is denoted as n and indicates the number of candidate locations. Integer decision variables $x_i$ may be used to indicate whether a location i is assigned to build a charging station and how many charging piles should be installed at this particular charging station. $x_i=0$ means that the corresponding candidate location i is not selected as a charging station. $x_i$ is an integer between 0 and P wherein P is the maximum numbers of piles that can be installed in each charging station. The maximum number P may be individually set for each station, according to the respective attributes of the station. Different candidate locations may have different attributes, such as geographical position, available space for building the station, and so forth. For purposes of illustration, however, the same P value is used herein for each station.

Optimization is an activity that searches for the best (i.e., optimal) solution to a problem. For optimization to be meaningful, there is an objective function to be optimized, and there exists more than one feasible solution. For this problem, there are two objectives. The first objective is to minimize construction cost of charging stations, while the second objective is to maximize coverage rate provided by the charging stations fulfill the most charging requirements). Optimal decisions need to be made in the presence of trade-offs between these two objectives.

The objective function of this optimization problem can be expressed as follows:

$$\text{Maximize}-\text{Weight}_{cost}*\text{Cost}+\text{Coverage} \qquad (3)$$

wherein Cost is the construction cost of charging stations, Coverage represents the proportion of charging requirements fulfilled by the charging stations, and $\text{Weight}_{cost}$ is a positive value that can be heuristically predetermined based on experience.

Since not all electric vehicles, in any solution, can always be charged at their respective frequently visited locations, a penalty is incorporated into the objective function. Penalty represents a tolerance for driving to other neighboring places for charging. Accordingly, the objective function may minimize the Penalty as follows:

$$\text{Maximize}-\text{Weight}_{cost}*\text{Cost}+\text{Coverage}- \\ \text{Weight}_{penalty}*\text{Penalty} \qquad (4)$$

wherein $\text{Weight}_{penalty}$ is also a positive value and can be heuristically predetermined by experience.

The total cost of constructing charging stations (Cost) is the sum of costs spent on all stations $\{x_1, x_2, \ldots, x_i\}$ as follows:

$$\text{Cost}=C(x_1)+C(x_2)+\ldots+C(x_n)=\Sigma_{i=1}^{n}C(x_i) \qquad (5)$$

wherein n is the total number of stations and $C(x_i)$ is the cost function for an individual station $x_i$. Cost function $C(x_i)$ is used to calculate the construction cost of charging piles at station $x_i$. $C(x_i)$ may be determined by the user. It should be appreciated that the construction cost of 2 charging piles may not always be twice as much as the construction cost for 1 pile.

Since not all candidate locations may be selected as charging stations, some vehicles should drive to nearby stations for charging. Optimizer 122 may allocate these vehicles to their nearest charging stations based on their distances from the nearest charging stations. The total distance generated by summarizing distances between the electric vehicles and their respective nearest charging stations may be taken into consideration in determining the penalty value.

FIG. 5 illustrates an exemplary method 500 of determining the penalty value. X is the input vector $(x_1, x_2, \ldots, x_n)$, which represents the current charging station placement solution. The nearest charging station for each vehicle is determined from the current placement solution, and the distance between the vehicle and the nearest charging station is computed. The distances for all the vehicles are then summarized as a penalty value.

The optimization process of maximizing the objective function to find a solution is subject to one or more constraints. The constraints may include, but are not limited to, the maximum number of charging piles that can be installed ($\text{NumOfPiles}_{max}$), maximum budget for building new charging stations ($\text{Budget}_{max}$), minimum coverage rate ($\text{Coverage}_{min}$), and so forth. The solutions determined by the optimization process should not exceed Budget$_{max}$, and the coverage rate should be larger than Coverage$_{min}$ to guarantee the drivers' satisfaction.

Accordingly, the optimization problem may be converted into the following integer programming problem in standard form:

Maximize (objective function):

$$\text{Maximize} - \text{Weight}_{cost} * \text{Cost} + \text{Coverage} - \text{Weight}_{penalty} * \text{Penalty} \quad (6)$$

Subjects to (constraints):

$$x_1 + x_2 + \ldots x_n \leq \text{NumOfPiles}_{max} \quad (7)$$

$$\text{Cost} = \Sigma_{i=1}^{n} C(x_i) \leq \text{Budget}_{max} \quad (8)$$

$$\text{Coverage} \geq \text{Coverage}_{min} \quad (9)$$

Figure 6:
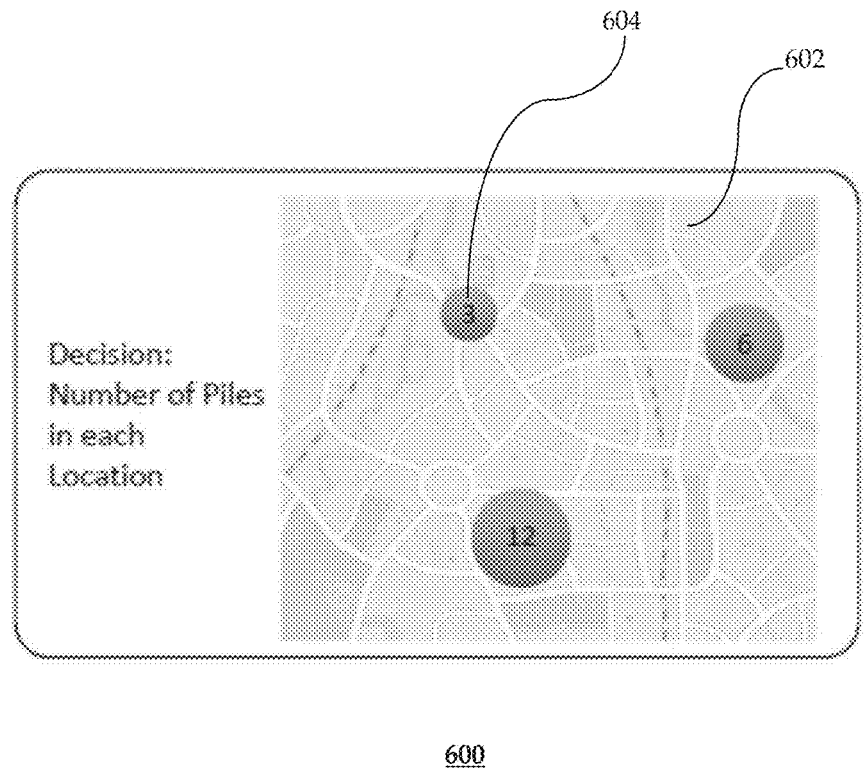
FIG. 6 shows an exemplary output display image.

Reverting to FIG. 2, at 210, output module 123 presents the solution of the optimization. In some implementations, output module 123 presents the solution on a display image displayed on output device 104. FIG. 6 shows an exemplary output display image 600. The output display image 600 includes a map 602 and the optimal locations 604 of the charging stations. Each optimal location may be indicated by a graphical element (e.g., circle or other geometric shape) on the map 602. The graphical element may indicate a number that represents the number of charging piles to be installed at that particular station. The size of the graphical element may be substantially proportional to the number of piles to be installed at the station.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system for placing charging stations, comprising:
   a non-transitory memory device for storing computer readable program code; and
   a processor device in communication with the memory device, the processor device being operative with the computer readable program code to perform steps including
   receive historical battery level data and location data of electric vehicles, the historical battery level data including initial battery level data and final battery level data,
   predict, based on the historical battery level data and the location data, a charging demand distribution over a set of locations by determining, based on the initial battery level data, a probability that a driver will choose to charge an electric vehicle given an initial battery level and determining, based on the final battery level data, an average charging time,
   select, from the set of locations, candidate locations based on the charging demand distribution,
   optimize placement and sizes of the charging stations at one or more of the candidate locations,
   present, via an output device, the optimized placement and sizes of the charging stations; and
   placing a charging station at one of the candidate locations in accordance with the optimized placement and sizes of the charging stations.

2. The system of claim 1 wherein the electric vehicles comprise electric cars.

3. The system of claim 1 wherein the processor device is operative with the computer readable program code to optimize the placement and sizes of the charging stations by determining a solution that minimizes construction cost of the charging stations and maximizes coverage rate provided by the charging stations.

4. The system of claim 1 wherein the processor device is operative with the computer readable program code to optimize the placement and sizes of the charging stations by fulfilling one or more constraints based on a maximum number of charging piles that can be installed, a maximum budget for building new charging stations or a minimum coverage rate.

5. A method for placing charging stations, comprising:
   receiving, by a processor device, sensor data of electric vehicles, wherein the sensor data comprises location data, initial battery level data and final battery level data;
   predicting, by the processor device and based on the sensor data, a charging demand distribution over a set of locations by determining, based on the initial battery level data, a probability that a driver will choose to charge an electric vehicle given an initial battery level and determining, based on the final battery level data, an average charging time;
   selecting, by the processor device and from the set of locations, candidate locations based on the charging demand distribution;
   optimizing, by the processor device, placement of the charging stations at one or more of the candidate locations; and
   placing a charging station at one of the candidate locations in accordance with the optimized placement of the charging stations.

6. The method of claim 5 wherein the set of locations comprises locations where stopping times of the electric vehicles are longer than a predetermined period.

7. The method of claim 5 wherein predicting the charging demand distribution further comprises determining an expectation of charging time based on the probability and the average charging time.

8. The method of claim 7 further comprising adjusting the expectation of charging time based on recorded parking times.

9. The method of claim 5 wherein predicting the charging demand distribution comprises accumulating expectations of charging time for multiple cars at different time points.

10. The method of claim 5 wherein selecting the candidate locations from the set of locations comprises selecting the candidate locations that are associated with a predicted demand that is greater than a predetermined number.

11. The method of claim 5 wherein optimizing the placement of the charging stations comprises performing an integer programming method.

12. The method of claim 5 wherein optimizing the placement of the charging stations comprises determining a solution that fulfills one or more constraints based on a maximum number of charging piles that can be installed, a maximum budget for building new charging stations or a minimum coverage rate.

13. A method for placing charging stations, comprising:
    receiving, by a processor device, sensor data of electric vehicles;
    predicting, by the processor device and based on the sensor data, a charging demand distribution over a set of locations;

selecting, by the processor device and from the set of locations, candidate locations based on the charging demand distribution;

optimizing, by the processor device, placement of the charging stations at one or more of the candidate locations, wherein optimizing the placement of the charging stations comprises determining a solution that minimizes construction cost of the charging stations, maximizes coverage rate provided by the charging stations and minimizes a penalty value determined by summarizing distances between the electric vehicles and their respective nearest charging stations; and placing a charging station at one of the candidate locations in accordance with the placement of the charging stations solution.

14. A method for placing charging stations, comprising:

generating a non-transitory computer readable medium embodying a program of instructions executable by a machine to perform steps for placing charging stations, comprising:

receiving sensor data of electric vehicles, wherein the sensor data comprises location data, initial battery level data and final battery level data;

predicting, based on the sensor data, a charging demand distribution over a set of locations by determining, based on the initial battery level data, a probability that a driver will choose to charge an electric vehicle given an initial battery level and determining, based on the final battery level data, an average charging time;

selecting, from the set of locations, candidate locations based on the charging demand distribution;

optimizing placement of the charging stations at one or more of the candidate locations; and placing a charging station at one of the candidate locations in accordance with the optimized placement of the charging stations.

15. The method of claim 14 wherein predicting the charging demand distribution comprises accumulating expectations of charging time for multiple cars at different time points.

16. The method of claim 14 wherein optimizing the placement of the charging stations comprises determining a solution that minimizes construction cost of the charging stations and maximizes coverage rate provided by the charging stations.

* * * * *